Sept. 13, 1932.                    G. BLOW                 1,876,599
                            COMBUSTION ENGINE
                         Filed Oct. 25, 1928       5 Sheets-Sheet 1

INVENTOR
George Blow
BY
Mauro & Lewis,
ATTORNEYS

Sept. 13, 1932.  G. BLOW  1,876,599
COMBUSTION ENGINE
Filed Oct. 25, 1928   5 Sheets-Sheet 2

INVENTOR
George Blow
BY
Mauro & Lewis
ATTORNEYS

Sept. 13, 1932.　　　　G. BLOW　　　1,876,599
COMBUSTION ENGINE
Filed Oct. 25, 1928　　5 Sheets-Sheet 5

INVENTOR
George Blow,
BY
Mauro + Lewis,
ATTORNEYS.

Patented Sept. 13, 1932

1,876,599

UNITED STATES PATENT OFFICE

GEORGE BLOW, OF NEW YORK, N. Y.

COMBUSTION ENGINE

Application filed October 25, 1928. Serial No. 315,032.

This invention has for its general object to produce an engine of the combustion type having high efficiency and capacity for developing high speed, while being comparatively light in weight, compact, simple in construction, relatively inexpensive to build, operate and keep in repair, and capable of a wide range of service. Other and more specific objects of the invention are stated below.

The commercial development of engines of the internal combustion class has been virtually confined to the reciprocating types and this, notwithstanding the manifest advantages of the turbine steam engine, has prompted numerous efforts to adapt and apply the principles of the turbine to engines of the combustion class. Such efforts, however, have not been commercially successful, due to the difficulties involved in combining the essential features and principles of operation of the turbine with the essential features and principles of operation of the combustion engine.

The present invention has for one of its objects to solve this problem.

Among the specific objects and advantages which this invention is designed to secure are: higher brake thermal efficiency; the complete expansion of the gases and utilization of the power developed thereby; the maximum turning moment on the main shaft throughout the expansion period; the utilization of exhaust pressure to increase the power developed; the elimination of back pressures, and of pressure on the valves; the elimination of the noise of the exhaust; simplicity in starting; economy of space; adaptability of the units to be combined in any desired number according to the amount of power required; greater power per unit of weight; absence of vibration; development of a practically constant torque; similarity in design of various parts, thus minimizing the number of patterns; and the elimination of a number of parts heretofore deemed essential in engines of the class to which this invention relates.

The invention comprises what are believed to be novel principles or methods of utilizing the expansive energy of the gaseous products of combustion or explosion taking place in a confined space. One important feature of the invention is that the compression of the air, required for the combustion of the fuel, takes place in the cylinder itself in which the gases are expanded. This feature effects a great saving in cost of construction and in the number of working parts; and it particularly effects a gain in efficiency. The gases expand directly and with maximum energy against the rotating vanes of a high pressure turbine. Furthermore, the gases exhausting from the high pressure turbine, after having imparted rotary movement thereto and to the power shaft, expand against a piston, moving it and the power shaft lengthwise. And finally the gases, which are not yet fully expanded, pass through and operate a low pressure turbine, thereby contributing further to the rotary movement of the shaft, and utilizing the expansive force of the gases to the full. Thus we have a three-step process, wherein the gases of combustion are utilized first for producing rotary movement of a power shaft, next for producing reciprocatory movement of a piston, and thirdly for producing additional rotary movement. And furthermore, the low pressure turbine acts as a muffler such that, instead of developing back-pressure which is a necessary incident of mufflers as usually constructed, it adds to the rotative energy of the power shaft.

The invention further comprises a process of generating power by first compressing a charge of air in a cylinder containing a turbine, then injecting the fuel, igniting the explosive mixture by means of the heat of compression, and utilizing the expansive pressure of the gases against turbine blades to produce rotation of a shaft.

Among the novel features of the present invention the following are deemed to be of major importance.

First. The compression of the charge of air takes place in the cylinder itself.

Second. Both high and low pressure turbines are in the same cylinder.

Third. The piston is so constructed as to be clear of all metallic contact with the cylinder walls, the office of the usual piston packing rings being performed by the gas itself, which is made to act as an automatic gas seal by the centrifugal force generated by the revolving piston. The fact that the piston has a rotary as well as a reciprocating movement makes effective lubrication exceedingly difficult. But by the construction hereinafter described lubrication is avoided, and the rotation of the piston is utilized to prevent a loss of pressure past the piston.

Fourth. The main bearings are of special construction, such as will meet the conditions of a shaft which has both reciprocatory and rotary movements, and at the same time provide for adequate and simple lubrication.

The accompanying drawings, which are diagrammatic in form, illustrate the principles of construction and operation of my invention, and also show what is at the present time the preferred embodiment thereof.

The turbine illustrated in the drawings is designed for the use of liquid fuel which is injected successively and at pre-determined intervals into the combustion spaces of the several cylinders.

Figure 1:
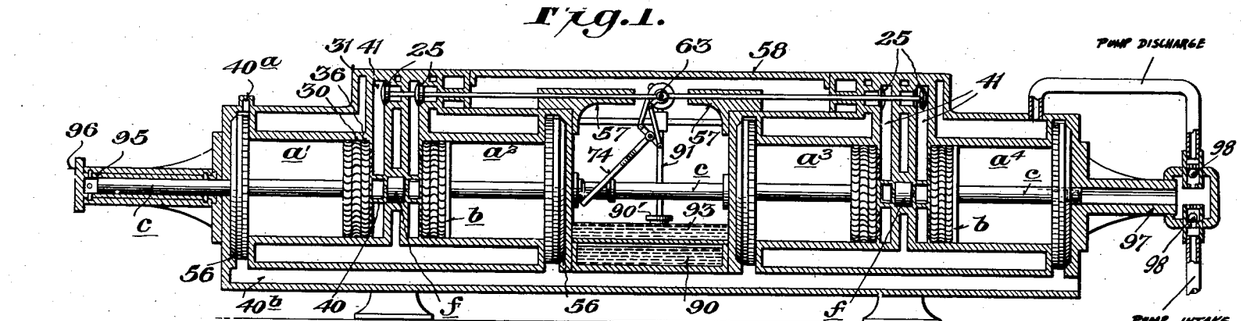
Fig. 1 is a longitudinal vertical section of a four-cylinder engine constructed according to my said invention.

Four cylinders $a^1$, $a^2$, $a^3$, $a^4$ are disposed horizontally and in line. In each cylinder is a piston $b$, the pistons being all of identical construction and being fixed on a piston rod $c$, which is common to all the pistons and passes through all the cylinders (Figs. 1, 2 and 3).

Each cylinder is provided with a suitable inlet valve 25 and exhaust valve 26 (Fig. 4) and operates on the four-cycle principle now commonly used in automobile practice. That is to say, successive strokes of the piston cause in each cylinder the suction, the compression, the ignition, and finally the exhaust of the products of combustion; and the relative arrangements of the cylinders are such that the ignition of the charge in one cylinder causes the compression of the charge in the next cylinder in turn, while the third is under suction and the fourth is under exhaust. On the following stroke the cylinder which just previously was under compression is under ignition; the next (which was under suction) is under compression; the next is under suction; and the one in which the ignition took place is under exhaust; and so on with each cylinder in turn through the cycle.

Figure 2:
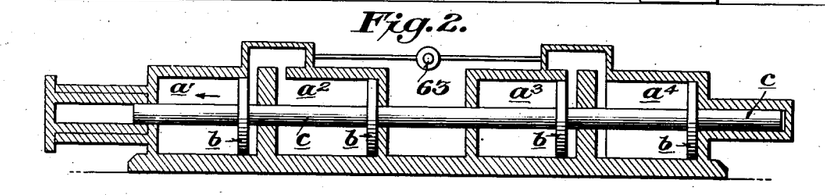
Figs. 2 and 3 are diagrams, also in longitudinal vertical section, showing respectively different positions of the pistons at the end of successive strokes.
Figure 3:
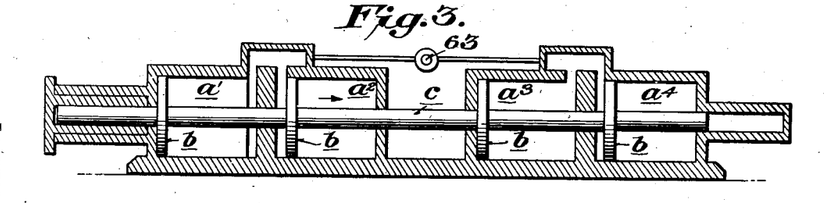

Thus, Fig. 2 shows the positions occupied by the several pistons $b$ and piston rod $c$ when cylinder $a^1$ is under ignition, $a^2$ is under compression, $a^3$ is under suction, and $a^4$ is under exhaust; and Fig. 3 shows the positions of the pistons and piston rod at the next stroke, when cylinder $a^2$ is under ignition, $a^3$ is under compression, and so on. As shown in these figures, the four cylinders are grouped in two pairs, and between the two pairs or the two cylinder blocks is a chamber which contains the valve operating mechanism and the oil baths. The positions of the cylinders of each pair are reversed relatively to each other; that is to say the valves and ports of cylinder $a^1$ are at the right hand end thereof, while the corresponding parts of cylinder $a^2$ are at the left hand end thereof; and so with respect to the other pair $a^3$, $a^4$. Hence when piston $b$ is at the combustion end of the cylinder $a^1$ the piston of cylinder $a^2$ is at what is functionally the opposite end thereof. This grouping of the several cylinders is necessary for accomplishing the described cycle of operations by the means herein described. A more detailed description of the construction and operation of the parts whereby the intake and ignition of the fuel and the exhaust of the combustion products are effected will be given later on; the object at present being merely to give a general idea of the construction and operation of the engine as a whole.

Figure 4:
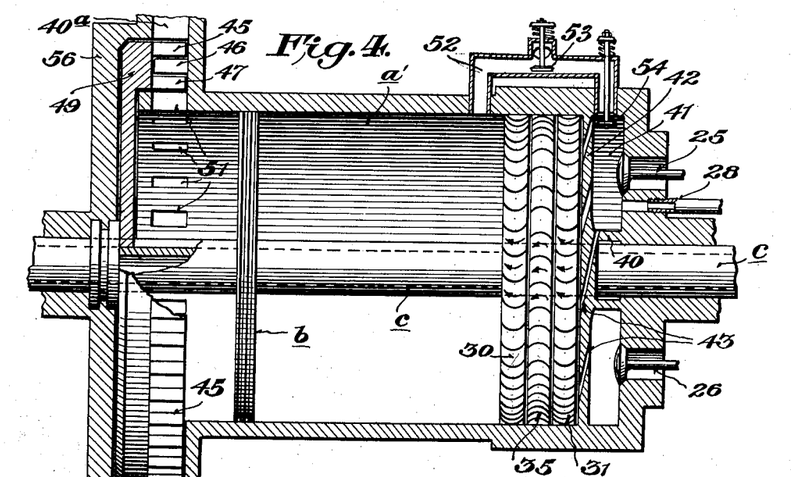
Fig. 4 is a horizontal section of a single cylinder.
Figures 5, 6:
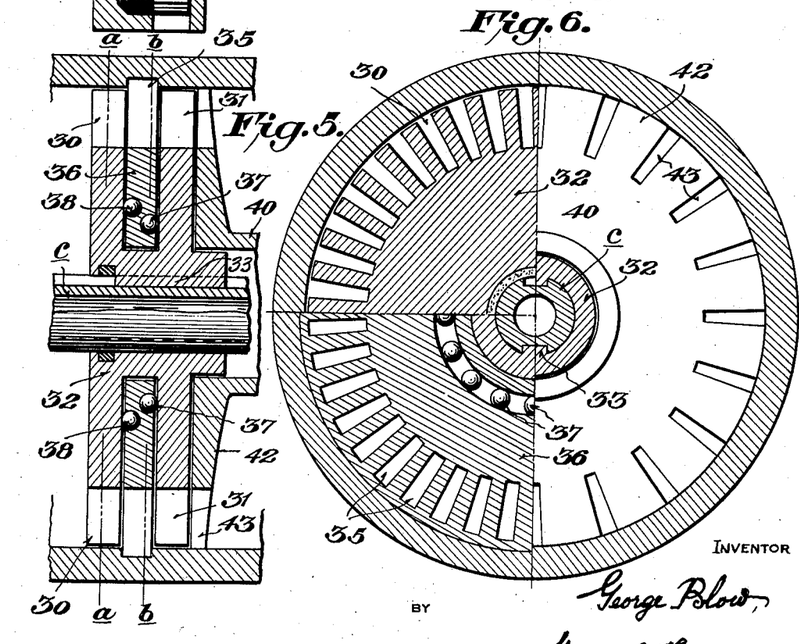
Fig. 5 is sectional detail of the high pressure turbine.
Fig. 6 is partly a face view of the pressure head of the combustion chamber adjoining the high pressure turbine, partly a quarter section on line $a$—$a$ (Fig. 5) and partly a quarter section on line $b$—$b$.

Figs. 4, 5 and 6 illustrate the details of one of the cylinders; and since the cylinders are of identical construction and equipment, the description of one applies to all.

In each cylinder there are two turbine units, a high pressure turbine and a low pressure turbine; one being located at one end of the cylinder and the other at the other end thereof. These turbines may be either of the impulse or the reaction type, and each comprises three sets of vanes or buckets (though the number need not be so limited), the middle set being fixed and the two outer forming the rotor of the turbine. This construction is well known.

In Fig. 4 the high pressure turbine is at the right and the low pressure at the left. The former comprises the two sets of vanes 30, 31, radially disposed, both sets being carried by a hub 32, which is keyed to the piston rod $c$ by a key 33 in the hub running in a long keyway in the piston rod (Figs. 5 and 6); so that the rotary movement of the turbine rotor is imparted to said rod, while the latter is free to reciprocate independently of the turbines. Thus the piston rod $c$ is also the main shaft of the engine, and has both a rotary and a reciprocating motion; whereas the turbines themselves have a simple rotary motion only.

The intermediate set of guide vanes 35 of the high pressure turbine is fixed in a groove in the cylinder wall (Fig. 5). The vanes of all three sets extend but a short distance from the perimeter towards the center, the object being to secure the maximum turning moment obtainable from the pressure of the gases, and at the same time to reduce the compression space to a minimum. The central disk 36, which carries the guide vanes 35, holds the rotor disks in position in the cylinder by means of two simple ball thrust bearings 37, 38, placed near the hub, where the linear velocity is relatively low. The rotor runs free of all rotary contact with the exception of these ball bearings.

A sleeve 40, which forms part of the combustion chamber 41 surrounds the piston rod and protects it from contact with the hot gases generated in chamber 41.

Combustion chamber 41 is separated from the cylinder and from the high pressure turbine by the vertical pressure head 42, the latter having a series of ports or nozzles 43 through which the gases pass to the cylinder and through which also the remnants of the waste products are exhausted. The intake valve 25 and exhaust valve 26 are shown in Fig. 4.

The low pressure turbine, shown at the left of cylinder $a^1$ (Fig. 4) has also three sets of vanes 45, 46, 47, arranged parallel to the shaft $c$. The intermediate vanes 46 are stationary, being fixed to the inner wall of the cylinder. The outside sets, 45, 47 are carried by a shallow drum 49 mounted on shaft $c$ by means of a key and groove connection like that of the hub 32 of the high pressure turbine; so that drum 49 and vanes 45, 47 turn with the shaft but permit the latter to reciprocate independently and freely. It will be observed that the movement of the rod or shaft $c$ relatively to the turbines is a simple reciprocation; for since both are rotating together and at the same speed the reciprocations of the rod or shaft are the same in effect as if both were stationary.

The low pressure turbine runs free of all contact with the cylinder and is provided with a small thrust collar at the hub only.

The cylinder communicates with the annular space occupied by the low pressure turbine through a series of ports 51. The piston $b$ during the greater part of the ignition stroke cuts off the expanding gases from ports 51; but, when the piston reaches the limit of its stroke to the left, ports 51 are uncovered, so that the expanding gases may enter the turbine space.

Since the action of all the parts is the same in each cylinder it is only necessary to describe the operation of one of them.

Referring to Fig. 4, when the piston $b$ travels to the left, air is drawn in through either valve 53 or 25 or both of them, and fills the cylinder. On the return stroke of the piston to the right, this air is compressed, passing through channel 52 and valve 54 and also through the turbine blades and through ports 43. The combustion space 41 is thus filled with compressed air at high temperature, and when fuel is injected through nozzle 28 combustion takes place and the gases are delivered to the turbine blades through ports 43. In some cases it may be found desirable to omit the channel 52 and cause the air under compression by the piston $b$ to pass into the combustion space 41 through the vanes of the turbine and the ports 43. The gaseous products of combustion under high pressure pass through the ports 43 in pressure plate 42 and then through the turbine, imparting rotation to the rotor and to the shaft $c$. The exhaust from the turbine forces back the piston $b$, thus moving the shaft (or rod) $c$ lengthwise. The piston rod carries with it the pistons in the other cylinders, causing them to perform severally their proper functions. When piston $b$ reaches the end of its travel to the left it uncovers ports 51, as already stated, permitting the gases, which are not yet fully expanded, to pass through and operate the low pressure turbine, which contributes an additional turning moment to the shaft $c$.

Most of the gases are exhausted through the low pressure turbine and pass by way of an annular passage or duct $40^a$ (Fig. 4) into the exhaust manifold $40^b$ (Fig. 1).

Thus the expansion of the gases of combustion takes place in three stages and performs three operations. The expansion acts first upon the high pressure turbine, the maximum force thereof being thus exerted in the rotation of the power shaft; then unexpended energy of the gases acts upon the piston, driving it lengthwise; and finally the residual energy of said gases is expended upon the low pressure turbine. Thus the expansive energy of the gases is fully utilized.

It is specially to be noted in this connection that the low pressure turbine is operated by means of unspent gas pressures which ordinarily would be absorbed and wasted in a muffler. Further it is to be noted that all mufflers exert back pressure, which means loss of power; whereas by means of the described arrangement of the low pressure turbine an effective muffler is provided wherein the escaping gases actually contribute to the rotation of the power shaft.

On the return stroke (the exhaust stroke) the remnants of the burned and spent gases which have not been exhausted through the low pressure turbine and the exhaust manifold are swept through the cylinder and discharged by way of the exhaust valve 26, and any suitable connecting passage (not shown) into the exhaust manifold 40b after having passed through (or around) the high pressure turbine; and on the following stroke (suction) a fresh charge of air is drawn in; and the cycle of operations is repeated.

It will be noted that in the preferred form of construction the gases pass through the high pressure turbine on the ignition stroke, and part of the spent gases pass through it on the exhaust stroke.

It will also be noted that in the preferred form air is admitted on the suction stroke through the valves 25 and 53. If desired, however, inlet valve 25 may be omitted in which case air on the suction stroke will be drawn in from the outside atmosphere or otherwise through valve 53 and the channel 52. Likewise the spent gases may be ejected via the channel 52, valve 54, and the exhaust valve 26. The valves 53 and 54 are of the spring poppet type.

It will be noted also that the rate of reciprocation of the piston is entirely independent of the rotation of the shaft, and hence its reciprocations may be fast or slow relatively to the speed of rotation without affecting in any wise the operation of the turbines. Furthermore, the piston sustains only the pressure of the charge, and does not have to withstand the shock and pressure of the explosion. The high pressure at the moment of combustion and the expansion of the gases immediately following are exerted upon, and are utilized by, the high pressure turbine.

The cylinders may be and preferably are cast in pairs instead of integrally as shown; and, as is common in turbine practice, the cylinders may be split horizontally, thus making it easy to assemble the various elements and making all the parts readily accessible. The cylinders are of the L-head type with the firing end of each turned toward the other. If desired, each may have a one-design and removable cylinder head instead of the integral head 56 at the low pressure end (Figs. 1 and 4).

Between the two pairs of cylinders is a distance piece 57 (Fig. 1) which serves to join the two pairs together, and also to form with the cylinder heads a chamber which completely encloses the valve operating mechanism (presently to be described) and the oil pump, and which also provides two oil reservoirs. The valve rods or stems, which extend over the tops of the cylinders are covered by a light top plate 58. Thus the entire engine and all moving parts are completely enclosed.

Figure 7:
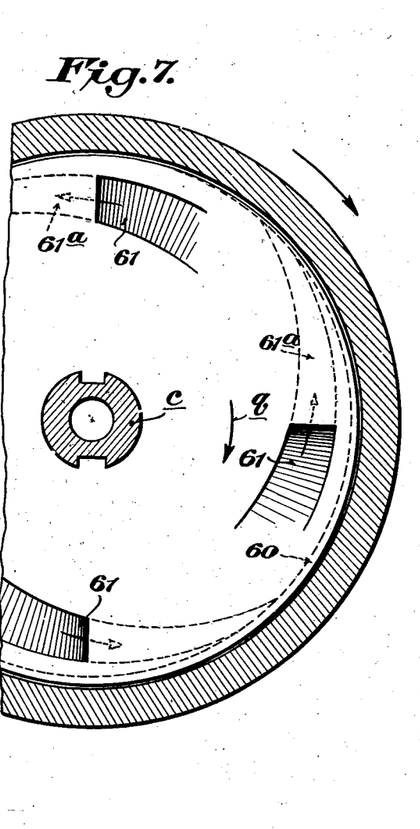
Figs. 7, 8 and 9 are detail views of one of the pistons.
Figure 8:
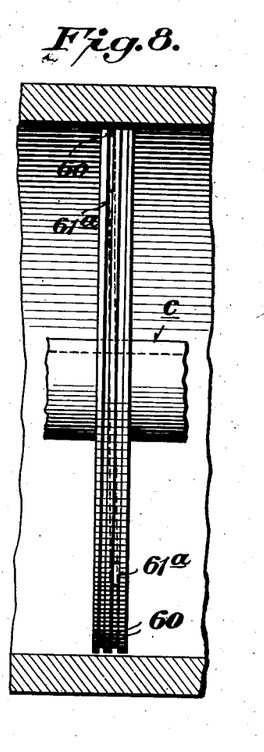
Figure 9:
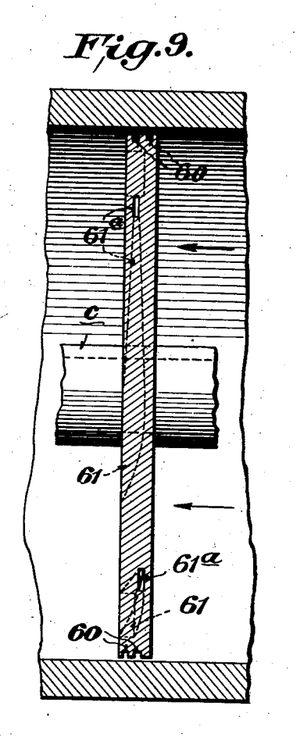

The details of construction of the piston are shown in Figs. 7, 8 and 9.

Figures 19, 20, 23:
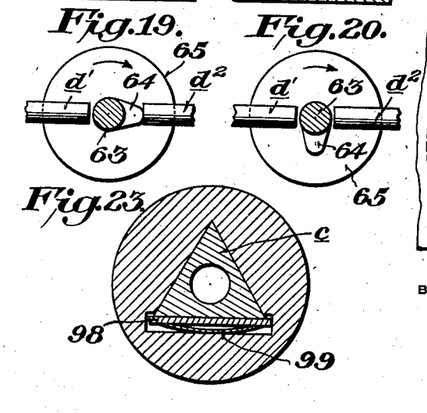
Figs. 21, 22 and 23 are sectional details of a modified form of shaft and shaft bearing.
Figure 21:
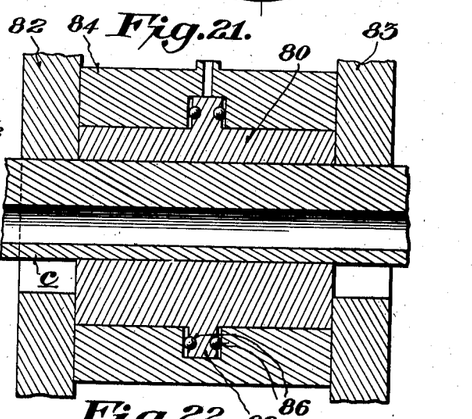
Figure 22:
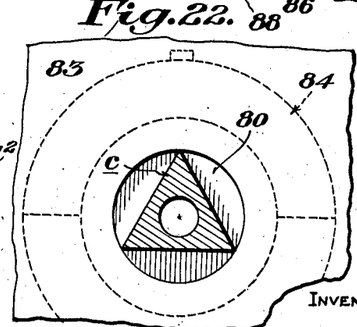

The piston rod c is hollow throughout its length (see Fig. 7) so that water may circulate through it from end to end and for the purpose of cooling. It may conveniently be made in two pieces joined together by a coupling between the cylinder blocks. The pistons b are integral with, or are attached permanently to, the piston rod. The latter may be circular in cross section as shown in Figs. 7–9, or of angular cross section preferably triangular as shown in Figs. 21–23, described later on.

As has been pointed out, the pistons sustain the load of compression only, which is light in comparison with the shock of explosion. For this reason, and also because there is no side thrust, a short or thin piston can be used. The periphery of the piston is not in contact with the cylinder wall, but has a slight clearance (Figs. 8, 9). By reason of the novel construction of the piston, the packing rings usually employed to prevent the passage of gas between the piston and cylinder wall are dispensed with, so that the piston has no frictional contact with the interior surface of the cylinder. The function of the usual piston packing rings is performed by a device which utilizes for that purpose the centrifugal force developed by the piston's rotation. Thus the rotary movement of the piston, which combined with its reciprocation would make lubrication difficult, is turned to useful account. To this end a shallow spiral groove 60 is cut in the circular face or rim of the piston, the turn of the spiral being such as to throw towards the high pressure turbine in each cylinder. Connected with this groove at several points are peripheral ports 61 opening from the back or low pressure turbine side of the piston, (the left side in Figs. 8 and 9). Ports 61 lead into curved channels 61ª in the body of the piston. These channels gradually contract in width as indicated by dotted lines, Fig. 7. The bottoms of the channels are inclined gradually inwards until what begins as a sloping groove becomes a channel or duct in the body of the piston, whose outlet is in the peripheral groove 60.

The action is as follows: Any gas after passing through the high pressure turbine, and attempting to pass the piston is trapped in groove 60 where it expands. It is here thrown against the cylinder wall by the centrifugal force of the high speed rotation, and at the same time it is engaged by the spiral groove, the inclination and cam effect of which tends to throw it back in the direction whence it came. Furthermore, due to the rotation of the piston, gas is forced into or picked up by the ports 61 on the back of the piston and is whirled into the groove. The extremely rapid rotation of the piston develops a great centrifugal force, which imparts to the gas trapped in groove 60 and that fed to it through channels 61ª the property of a solid substance in its resistance to the gases of explosion attempting to pass the piston at its edge, and a counter pressure of gas is developed around the entire circumference of the piston between it and the cylinder wall, in opposition to the passage of gas from the forward side of the piston. This provides an effective seal against a loss of pressure by the passage of gas between the piston and the wall of the cylinder. The piston is in fact a type of impeller, which tends to increase the pressure in the cylinder through the groove channel, rather than the reverse. This is regarded as a very important feature of the design; for it provides a gas-tight piston which is fully adequate to the service of compression and expansion, and which is free to rotate without metallic contact with the cylinder walls. The advantages are obvious.

The valve actuating mechanism is illustrated in Figs. 10 to 14 and Figs. 17 and 18.

The valves 25, 26 (Figs. 1 and 4) are of the standard poppet type and are operated by cams carried by a cam shaft 63, located in the chamber between the two cylinder blocks and extending transversely to the main shaft across the upper part of said chamber. Each cam 64 operates two valves, as presently described with reference to Figs. 17, 18; so that only four cams are required, see Figs. 17 and 18.

The cam shaft preferably is operated directly from piston rod $c$ through the intermediary of a special link motion, which is both positive and accurate, and by means of which the cam shaft is rotated step by step, making one complete revolution for every four strokes of the piston. Each stroke of the piston rotates the cam shaft through an arc of 90 degrees.

The link motion referred to imparts intermittent rotary movement to cam shaft 63 through a cam disk 65 fixed on said shaft and provided with four peripheral cam surfaces 66 each terminating in an abutment or shoulder 67. The four abutments are equidistant from each other, being 90 degrees apart, and they are located alternately on opposite faces of disk 65. Thus disk 65 may be regarded as in effect a ratchet wheel having four equidistant teeth. For engagement with these abutments there are two rotary arms 70, one on each side of said disk 65, each arm attached to a collar 71 which encircles and is free to rotate on cam shaft 63. These rotating arms act as pawls. Each has at its outer end a part 78 (Figs. 12 and 14) which extends at a right angle with the arm over and in contact with the periphery of disk 65, said rectangular part having an obliquely disposed socket 68, containing a spring-pressed ball 69 which constitutes the tooth of the pawl.

Motion is imparted to arms 70 from the reciprocations of piston rod $c$ through a yoke 74 pivoted on shaft 75 and having integral cross arms 73. The outer end of each cross arm 73 is pivoted to the lower end of a link 72, whose upper end is pivotally attached to one of the rotary arms 70.

Figure 10:
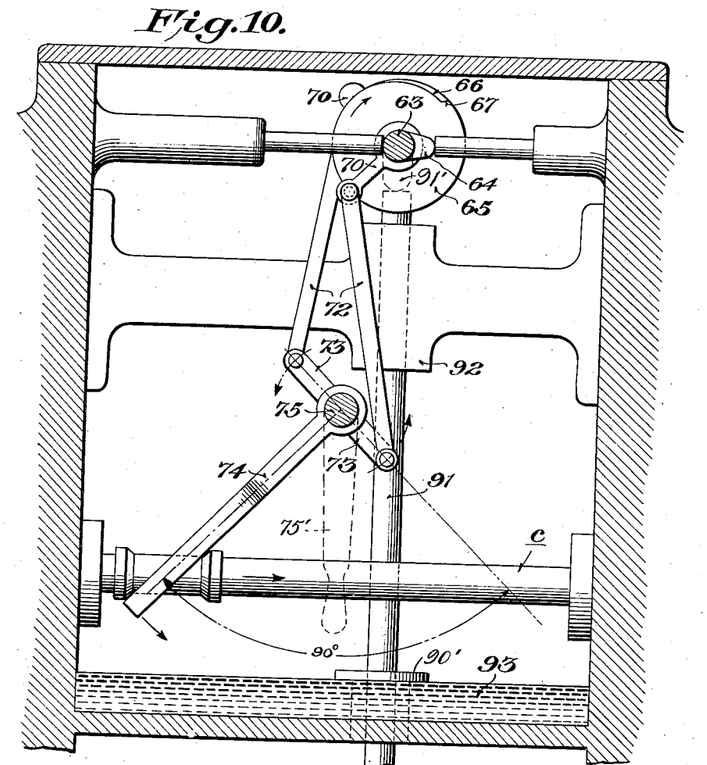
Fig. 10 is a longitudinal vertical section showing in elevation the actuating mechanism for the cam shaft.
Figures 11, 12, 13, 14:
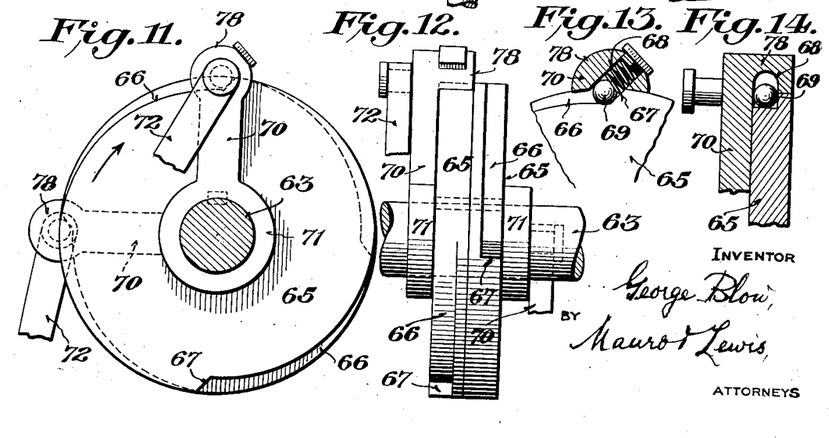
Figs. 11, 12, 13 and 14 are details of parts of the cam actuating devices.

The action is as follows: When the piston rod moves to the right, as it is about to do as shown in Fig. 10, yoke 74 swings to the right, moving the right hand link 72 upward and turning arm 70 to which the latter is pivoted in a forward direction, thus rotating cam disk 65 and cam shaft 63 through an arc of 90 degrees; the ball carried by that arm being engaged with an abutment 67 on disk 65. The other link 72 at the same time moves downwardly, causing its arm 70 to turn in the reverse direction. During this reverse movement the engaging ball 69 of the last named arm rides over the cam surface 66, gradually rising in its socket 68 until it comes to the abutment 67 where that cam surface terminates, when it is forced by its spring over the edge of said abutment and into engagement therewith. This occurs just at the end of the piston stroke. At the succeeding stroke (in the reverse direction) the link 72 and arm 70 last referred to (those to the left in Fig. 10) propel cam disk 65 through another quarter turn forward. Thus the two links and their respective connections work in alternation and rotate the cam shaft one complete turn for every four strokes of the piston rod $c$.

Figure 17:
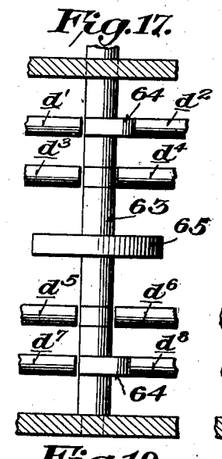
Figs. 17, 18, 19 and 20 are diagrams illustrative of the valve movements.
Figure 18:
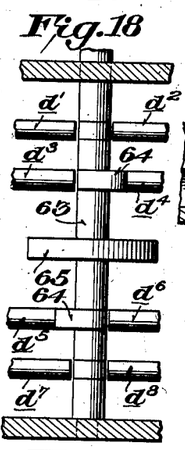

The relative positions of the cams and valve stems or rods are shown in Figs. 17 and 18, from which it will be clearly seen how each cam 64 actuates two valve rods at each rotation of the cam shaft. Beginning at the top of Fig. 17 the first cam 64 actuates rods $d^1$, $d^2$; the next actuates rods $d^3$, $d^4$; and so on. These four valve rods may belong each to one of the inlet valves. Thus rod $d^1$, we will say, operates the inlet valve of cylinder $a^1$; rod $d^2$ operates the inlet of cylinder $a^3$; rod $d^3$ the inlet of cylinder $a^2$; and rod $d^4$ the inlet of cylinder $a^4$. The lower group of rods will then belong to the exhaust valves. Rod $d^5$ will operate the exhaust of cylinder $a^1$; rod $d^6$ that of cylinder $a^3$; $d^7$ that of $a^2$, and $d^8$ that of $a^4$.

The timing of the valves and the injection of the fuel are dependent upon the reciprocations of the pistons and are entirely independent of the speed of rotation. Thus the shaft may be rotating at high speed while the reciprocation of the pistons is relatively slow, as the speed of the latter depends upon the pressure that is exerted upon the pistons by the products of combustion after they have passed the high pressure turbines.

The injection of fuel is so timed that combustion occurs the instant the pistons reach the end of their travel on the compression stroke; or it may be varied, both in timing and the duration of the injection, to accomplish complete combustion of the fuel and the maximum utilization of the energy therefrom. The means for accomplishing this forms no part of the present invention, there being available several types of apparatus for that purpose, which are now in use on reciprocating engines.

Figure 15:
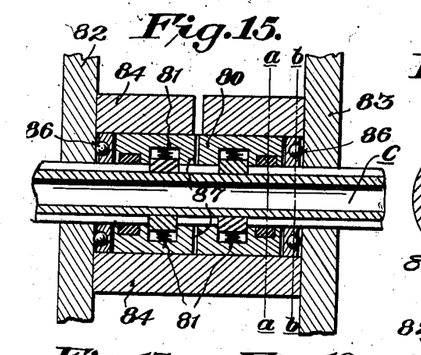
Fig. 15 is a sectional detail of one of the main bearings, the section being taken lengthwise of the main shaft.
Figures 15A, 16:
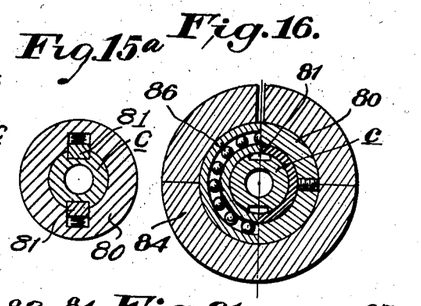
Figs. 15a and 16 are cross sectional details of the same.

Referring now to Figs. 15 and 16, (the latter being a cross section, half on line a—a and half on line b—b of Fig. 15) the construction of the main bearings will be described.

Only two main bearings are required, one for each cylinder block. These are preferably located as indicated at f, f, Fig. 1, one at the middle of each cylinder block. A separate tailbearing, hereinafter referred to, is provided to receive the external load. The construction shown in detail in Figs. 15 and 16 is designed for a shaft that is circular in cross section. In Figs. 21, 22 is illustrated an alternative construction (hereafter described) for use with a shaft that is triangular in cross section.

Shaft c is surrounded by a sleeve or bushing 80, which constitutes an annular bearing and is so constructed and connected with the shaft that it partakes of the rotation thereof but does not reciprocate with it. Said annular bearing 80 is mounted on shaft c, so as to rotate therewith, while permitting the shaft to reciprocate freely through it. Thus the outer surface of annular bearing 80 is a rotating bearing, while the inner surface thereof is reciprocating bearing. Said annular bearing is completely enclosed between the two cylinder heads 82, 83, and the encircling sleeve 84, and oil under high pressure is forced around it and through it to the shaft c. Ball thrust collars 86 are provided, one at each end of bearing 80, which serve to keep it in place and to take the slight drag of the shaft. The effect of this annular bearing is to resolve the compound motion of shaft c into its two components, rotation and reciprocation; that is to say, since bushing 80 rotates wtih the shaft, the movements of the latter through the bushing are simple reciprocations, the same in effect relatively as if both were non-rotating. On the other hand, the movement of bearing 80 with respect to the stationary sleeve 84 is one of simple rotation. Hence there is no problem of lubrication arising because of the compound motion of shaft c.

The inside of said annular bearing 80 is fitted with metallic packing and spring gas-checks 81, which fit in the key ways in the shaft c and are similar in function to piston rings. Said inside surface of bearing 80 is lubricated through oil holes 87. The lubrication is effected by means of an oil pump 90' of any suitable construction located between the cylinder blocks, which takes the oil from a reservoir 90 (Fig. 1) directly beneath it, whence it is conveyed by the usual or any suitable line of piping (not shown) to the points to be lubricated. The stem 91 of the oil pump is shown in Figs. 1 and 10. It passes through a guideway in a thickened part of cross beam 92, and is operated preferably by a cam 91' on shaft 63. An excess of oil should be supplied to the main bearings to act as an oil seal, and to lubricate the piston rod.

As already stated, the cam shaft and valve gear are entirely enclosed. They are lubricated by a splash system with every stroke of the piston rod (Fig. 10). The splash bath 93 is just above the main oil reservoir (Fig. 1). It is kept at a constant level by the oil pump, and the lower end of yoke 74 dips into it and splashes the oil at each stroke of the piston.

The tail bearing consists of a sleeve 95 (Fig. 1) fitted to receive either the circular or the triangular shaft (the latter being shown in Fig 21–23 and described below). It is similar in principle and function to the main bearings; that is to say, the sleeve 95 is connected with the shaft c so as to rotate therewith while permitting it to reciprocate freely therein, the outer surface of the sleeve acting as a rotating bearing while the inner surface provides a reciprocating bearing. The end of the tailbearing is attached to a flange shaft coupling 96 to which the external load is secured. Suitable holes should be provided in the tailbearing for the discharge of the water pumped into the hollow shaft by the water pump located at the opposite end of the engine (Fig. 1) and which may be of any suitable type. Preferably a casting 97 bolted to the cylinder head forms the cylinder of the pump and the end of piston rod c constitutes the plunger thereof. Ordinary ball valves 98 form the intake and discharge valves; and a third ball valve may be located in the end of the piston rod itself, so as to permit the passage into the interior of the rod of only the amount of water required for the cooling of the same, the balance being forced through the discharge valve into the circulating system.

The cylinders may be cooled by means of water jackets in the usual way. Or they may be air-cooled as in common practice, thereby effecting a further saving in weight.

The triangular form of shaft c, above referred to, is shown in Figs. 21-23; Fig. 21 being a longitudinal section of the shaft and main bearing, Fig. 22 a transverse section thereof, and Fig. 23 a cross sectional detail showing a gas check.

The annular bearing 80 differs only in detail from that shown in Figs. 15 and 16. The central bore is triangular in cross section and no keyway is needed. The balls 86 which take the end thrust are located between a collar 88 on the bearing and the walls of a groove in the encircling sleeve 84 in which said collar turns. With the triangular shape a more simple form of gas check may be used, such as shown in Fig. 23, consisting of a flat plate 98 which is under the pressure of a spring 99, whereby wear is automatically taken up. Because of the simplicity of this construction the triangular form of piston rod is preferred.

What is claimed is:

1. In an engine, the combination of a cylinder, a shaft free to revolve and to reciprocate in said cylinder, a piston fixed on said shaft within said cylinder, a turbine rotor within said cylinder and fixed on said shaft against rotation relative thereto but through which the shaft is free to reciprocate, and a combustion chamber in communication with said rotor.

2. In an engine, the combination of a cylinder, a combustion chamber in open communication with said cylinder, a revoluble shaft mounted to reciprocate longitudinally through said cylinder, a piston fixed on said shaft within the cylinder, and a turbine rotor fixed on said shaft against rotation relative thereto but through which the shaft is free to reciprocate, said rotor being located within the cylinder and between the combustion chamber and said piston.

3. In an engine, the combination of a cylinder, a combustion chamber in communication therewith through suitable ports, a shaft mounted to revolve and to reciprocate in said cylinder, a piston fixed on said shaft, a turbine rotor mounted on said shaft to revolve therewith between said combustion chamber and piston, and another turbine rotor mounted on said shaft to revolve therewith and on the opposite side of the piston from the combustion chamber, said shaft being free to reciprocate through said rotors.

4. In an engine, the combination of a plurality of alined cylinders, separate combustion chambers one in communication with each cylinder, a revoluble and reciprocable shaft extending through said alined cylinders, pistons fixed on said shaft, one within each cylinder, and turbine rotors, one within each cylinder and mounted on said shaft to rotate therewith between the respective combustion chambers and pistons, said shaft being free to reciprocate through said rotors.

5. In an engine, the combination of a plurality of cylinders arranged in line with each other, a revoluble and reciprocable shaft common to all the cylinders, a piston and a turbine rotor on the shaft in each cylinder, said pistons being fixed on the shaft to revolve and reciprocate therewith and said rotors being slidably mounted on and rotatably fixed to the shaft.

6. In an engine, the combination of a pair of alined cylinders, a combustion chamber in each cylinder next to the end adjacent the other cylinder, a turbine rotor in each cylinder adjacent the respective combustion chambers, a revoluble shaft slidable through said cylinders and rotors but fixed to the rotors to revolve therewith, and a piston in each cylinder and fixed to the said shaft between the respective rotors and the opposite ends of the cylinders.

7. In an engine, the combination of a pair of alined cylinders, a combustion chamber in each cylinder next to the end adjacent the other cylinder, a high pressure turbine rotor in each cylinder adjacent the respective combustion chambers, a low pressure turbine rotor in the end of each cylinder opposite the said high pressure rotor, a revoluble shaft keyed to said rotors to revolve therewith but slidable through said rotors and cylinders, and a piston in each cylinder fixed on said shaft between the respective high and low pressure rotors.

8. In an engine, the combination of a cylinder, a revoluble shaft in said cylinder, a turbine rotor keyed to the shaft to revolve therewith, means directing products of combustion into operative relation with said rotor, and a reciprocating piston in the said cylinder in the path of said products of combustion after they have passed said rotor.

9. In an engine, the combination of a plurality of alined cylinders, a revoluble shaft reciprocable in said cylinders, an air inlet valve and an exhaust valve for each cylinder, a turbine rotor keyed to said shaft in each cylinder and through which rotors the shaft is free to reciprocate, means directing products of combustion into operative relation with said rotors, and pistons, one in each cylinder, fixed on said shaft to revolve and reciprocate therewith in the path of the products of combustion after they pass said rotors.

10. In an engine, the combination of a cylinder, a revoluble and reciprocable shaft mounted in said cylinder, a high pressure rotor and a low pressure rotor keyed to said shaft to revolve therewith but through which the shaft is free to reciprocate, means directing products of combustion successively through said rotors, and a piston fixed on said shaft to revolve and to reciprocate therewith in said cylinder between said high pressure and low pressure rotors.

11. In an engine, the combination as defined in claim 10 characterized in that the vanes of the rotors are located adjacent the peripheries of the respective rotors.

12. The combination defined in claim 10 characterized in that the low pressure rotor is of greater diameter than the high pressure rotor.

13. The combination defined in claim 10 characterized in that the vanes of the high pressure rotor extend radially of the shaft and the vanes of the low pressure rotor extend parallel to the shaft.

14. The combination as defined in claim 5 in which the cylinders are grouped in pairs, the firing ends of the cylinders comprising each pair being adjacent each other.

15. In an engine, the combination of a cylinder, a revoluble and reciprocable shaft in said cylinder, a bushing keyed to said shaft to revolve therewith but through which the shaft is free to reciprocate, a bearing in which said bushing rotates, a piston fixed to said shaft, within said cylinder, a turbine rotor fixed on said shaft against rotation relative thereto but through which the shaft is free to reciprocate, and a combustion chamber in communication with said rotor.

16. In an engine, the combination of a plurality of alined cylinders, separate combustion chambers, one in communication with each cylinder, a revoluble and reciprocable shaft extending through said alined cylinders, a plurality of bearings for said shaft each comprising a bushing keyed to the shaft to revolve therewith but through which the shaft is free to reciprocate and a bearing in which said bushing rotates, pistons fixed on said shaft one in each cylinder, and turbine rotors, one within each cylinder and mounted on said shaft to rotate therewith between the respective combustion chambers and pistons, said shaft being free to reciprocate through said rotors.

17. In an engine, the combination of a cylinder, a combustion chamber in communication therewith, a revoluble and reciprocable shaft passing through said cylinder, a turbine rotor keyed to said shaft to revolve therewith but through which the shaft is free to reciprocate, and a piston fixed on said shaft to revolve and reciprocate therewith out of contact with said cylinder, said piston having on its periphery a spiral gas-trapping groove.

18. In an engine, the combination of a cylinder, a combustion chamber in communication therewith, a revoluble and reciprocable shaft passing through said cylinder, a turbine rotor keyed to said shaft to revolve therewith but through which the shaft is free to reciprocate and a piston fixed on said shaft to revolve and reciprocate therewith out of contact with said cylinder, said piston having on its periphery a spiral gas-trapping groove, and channels within the body of the piston in communication with said groove which channels have ports opening on the face of said piston.

19. In an engine, the combination of two spaced cylinder blocks of the same construction, each block comprising two cylinders, a revoluble and reciprocable shaft common to all the cylinders, a turbine unit in each cylinder mounted to rotate with said shaft without reciprocating therewith, and a piston in each cylinder fixed on said shaft to rotate and reciprocate therewith.

20. An engine as defined in claim 19 wherein each cylinder is provided with an intake and an exhause valve, and valve-actuating mechanism located between the two cylinder blocks.

21. An engine comprising a pair of spaced cylinder blocks, each block consisting of two cylinders, a revoluble and reciprocable shaft passing through all of said cylinders and the space between the said blocks, a turbine unit in each cylinder mounted to rotate with said shaft without reciprocating therewith, an intake valve and an exhaust valve for each cylinder, and valve operating mechanism operatively connected with said shaft in the space between said blocks.

22. In an engine, the combination as defined in claim 10 characterized in that the revolvable and reciprocable shaft is mounted in a bearing comprising a bushing through which said shaft is free to reciprocate, said bushing being secured to said shaft to revolve therewith.

23. In an engine, the combination as defined in claim 10 characterized in that the revolvable and reciprocable shaft is provided with a bushing mounted thereon to revolve therewith, the shaft being lubricated and reciprocating through said bushing, and a sleeve encasing said bushing within which the bushing is free to rotate.

In testimony whereof I have signed this specification.

GEO. BLOW.